Patented July 19, 1932

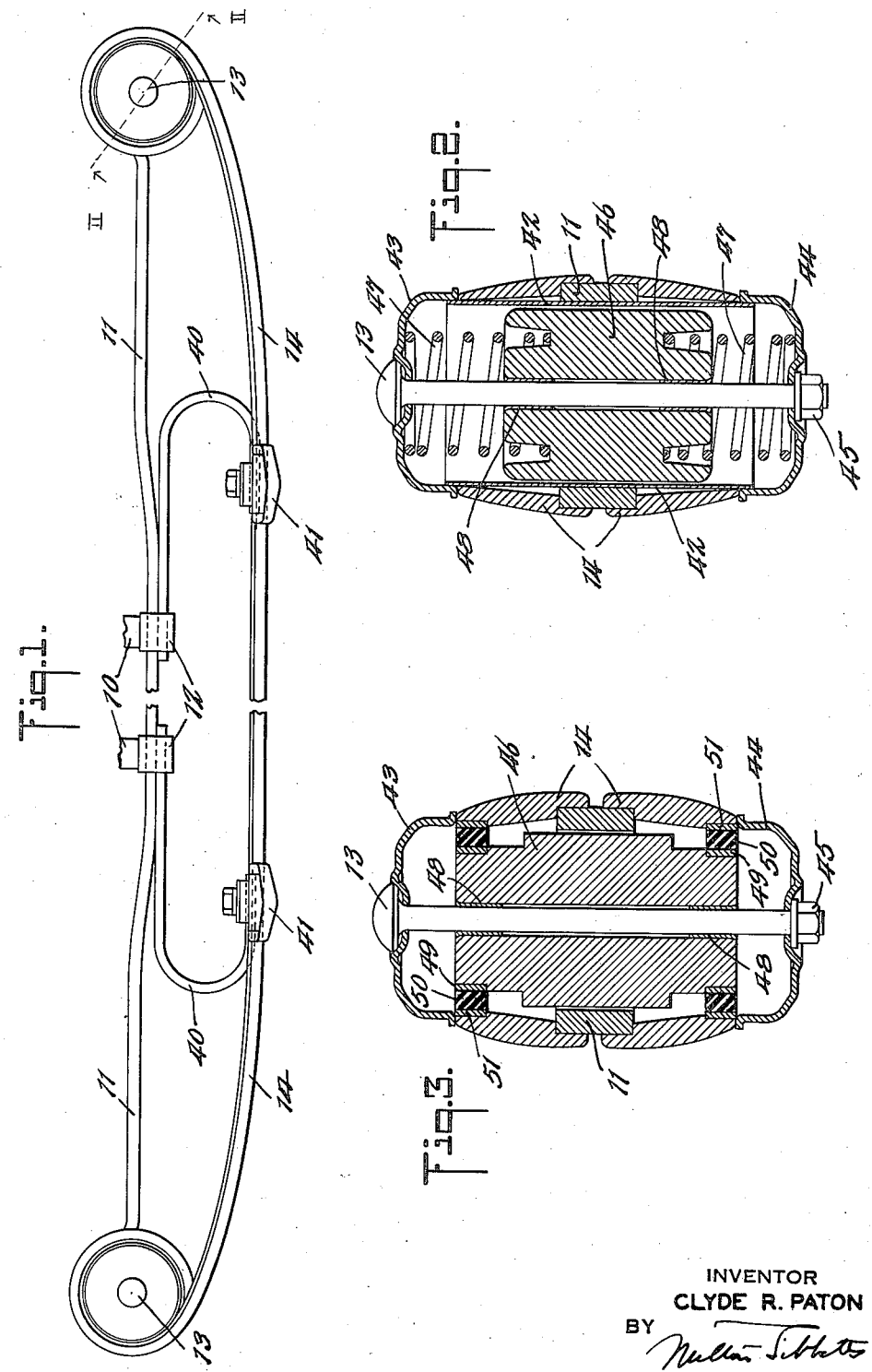

1,867,708

UNITED STATES PATENT OFFICE

CLYDE R. PATON, OF DETROIT, MICHIGAN, ASSIGNOR TO PACKARD MOTOR CAR COMPANY, OF DETROIT, MICHIGAN, A CORPORATION OF MICHIGAN

AUTOMOBILE CONSTRUCTION

Application filed May 25, 1931. Serial No. 539,699.

This invention relates to automobile construction and is particularly concerned with the reduction of vibrations in the vehicle commonly known as road vibration or shimmy.

It is the general object of the invention to provide improved means for the reduction of road vibration or shimmy in vehicles.

It is a further and more specific object of the invention to provide an improved vibratory system whose vibrations neutralize or oppose the vibrations in the vehicle.

A further object of the invention is the provision of a novel form of oscillatable mass in association with the bumper of the vehicle by means of which the road vibration or shimmy will be counteracted.

Further objects and features of the invention will be apparent from the following description of one convenient and specific embodiment thereof given, by way of example, to indicate how the invention may be carried into effect.

In the accompanying drawing:—

Fig. 1 is a top plan view of a construction embodying the invention;

Fig. 2 is an enlarged vertical section of a part of Fig. 1 the section being taken along the line II—II; and Fig. 3 is a view similar to Fig. 2 showing a modified form.

The phenomenon of what is known as road vibration or shimmy is well known and the chassis, vehicle frame, bumper and body of the vehicle form parts of a primary vibratory system which partake of the vibrations in the general system. The extent and frequencies of vibrations depend upon the specific construction of the vehicle and on the general road conditions; and the general tendency of oscillations of the frame and bumper assembly, particularly with motor vehicles in which the engine is resiliently mounted, is usually about a neutral axis which is close to and parallel to the crankshaft axis.

As indicated above it is the general object of this invention to provide improved means comprising a secondary vibratory system, for the absorption or reduction of road vibration or shimmy transmitted to the primary vibratory system through the vehicle wheels and, as will be apparent from the specific description hereinafter given, this means comprises vertically vibratable masses mounted on the ends of the impact bar of the bumper.

In the drawing there is shown the ends of the frame horns 10 to which is attached the fastening or back bar 11 of the bumper by means of clamps 12. At the extremities of the fastening or back bar 11 is attached by means of pins 13 the impact bar 14 of the usual form. In addition to this attachment or joint at their extremities, the two bars 11 and 14 are connected together by means of intermediate resilient members 40, the attachment being effected by means of the aforesaid clamps 12 and further clamping members 41.

In accordance with this invention there are provided at the extremities of the impact bar 14 masses which are vibratable vertically so as to provide a secondary vibratory system which will vibrate in opposition to the vibrations of the primary system comprising the car frame and other parts, and in a plane perpendicular to the neutral axis of the system. One convenient form is shown in vertical section in Fig. 2. The end of the fastening or back bar 11 is curved as shown in section in this figure and is enveloped by upper and lower curved fingers of the impact bar 14. Within the curved portions of the bars 11 and 14 as shown in Fig. 2, there is positioned a cylindrical member 42 which has its ends closed by upper and lower caps 43 and 44 which are held in place by means of the pin 13 and a nut 45. It will be seen therefore that there is provided an enclosed chamber at each extremity of the impact bar. Within this chamber there is positioned a weight 46 which has a central bore pierced by the pin 13 with which the weight is thus coaxial. Between the upper and lower caps 43 and 44 and the weight 46 there are provided spring members 47 positioned in grooves in the weight itself. It will be seen that by virtue of this construction the weight 46 can oscillate vertically and this oscillation is substantially opposite in phase to the oscillation or vibrations of the main or primary system previously indicated. If desired, between the pin 13 and the inner walls of the bore in the weight 46, small frictional packings 48 may be provided, the amount of friction to be predetermined according to the circumstances.

In Fig. 3 there is shown a convenient modification in which like references indicate like parts. Within the chamber formed by the curved fingers of the bars 11 and 14 the mass 46 is mounted although in this embodiment the containing cylinder 42 is omitted. Instead of mounting the mass upon coil springs as shown in Fig. 2 the mass 46 is attached to the sides of the chamber formed by the members 11 and 14 by rubber rings or the like which entirely support the mass and yieldingly resist the vibratory movement thereof by a shearing action of the rubber. In the embodiment illustrated in Fig. 3 the actual rubber suspension takes the form of upper and lower composite rings comprising an inner annular ring of metal 49, an intermediate and preferably vulcanized rubber ring 50, and an outer annular ring 51 of metal. The three rings are formed together as an integral unit and thus facilitate replacement. Furthermore, the rubber may be vulcanized after the assembly of the unit itself. It will be seen from the construction illustrated in Fig. 3 that the upper and lower composite rings are seated in shouldered grooves in the mass 46 and formed in and by the curved ends of the bar 14 and the upper and lower caps 43 and 44 respectively.

In one specific construction it is found that a mass at each end of the impact bar of approximately 12 pounds weight forms a suitable secondary vibratable system which will neutralize or counteract the vibrations in the main frame of the vehicle. Such a weight of course will vary according to the particular vehicle to which the mass is applied and according to various practical requirements and conditions.

It will be appreciated that the above described embodiments of the invention are given purely by way of example, and it will be further appreciated that various modifications and alterations may be made according to practical requirements without departing from the spirit of the invention as set out in the appended claims.

I claim:

1. A bumper for use on vehicles comprising an impact bar and a weight vibratable in a vertical direction at each end of said bar.

2. A bumper for use on vehicles comprising an impact bar and a fastening bar, said bars being connected at their extremities, and vibratable weights as parts of said connections.

3. A bumper for use on vehicles comprising an impact bar and a fastening bar and pivotal connections between said bars at their extremities, a spring suspended mass forming part of each of said connections.

4. A bumper for use on vehicles comprising an impact bar having a closed chamber at each extremity and a resiliently suspended mass in each chamber.

5. A bumper for use on vehicles comprising an impact bar and a fastening bar said bars being connected at their extremities, said connections comprising closed chambers, a vertically vibratable mass being suspended in each chamber.

6. A bumper for use on vehicles comprising an impact bar, a fastening bar and a pivotal connection joining the extremities of said bars, each of said connections comprising a chamber, and a pin in each of said chambers, a vertically vibratable mass being mounted in said chambers.

7. A bumper for use on vehicles comprising an impact bar attached at its extremities to the vehicle said attachment comprising a pin, a vertically vibratable mass being resiliently mounted coaxially on said pin.

8. A bumper for use on vehicles comprising an impact bar, a fastening bar, said bars being joined at their extremities, each joint comprising a chamber and a pin in said chamber, a mass surrounding and coaxial with said pin and springs between the upper and lower faces of said chamber and the weight.

9. A bumper for use on vehicles comprising an impact bar, a fastening bar, said bars being joined at their extremities, each joint comprising a chamber, each chamber having a mass therein and rubber members forming a connection between said mass and the side walls of the chamber.

10. A bumper for use on vehicles, a chamber on said bumper, and vehicle vibration dampening means operatively associated with said chamber.

11. A bumper having a bumper bar, a chamber formed by said bar, and vehicle vibration dampening means operatively associated with said chamber.

12. In a motor vehicle bumper, an impact bar, the ends of said bar being bent to form rings, a cylinder at each ring cooperating with each ring to form chambers, and a vertically vibratable mass suspended in each chamber.

13. In a motor vehicle, a bumper having an impact bar and a fastening bar, said bars cooperating to form a chamber, and vehicle vibration dampening means operatively associated with said chamber.

14. In a motor vehicle frame subject to vibration about an axis, a vertically rigid arm secured to said frame and extending therefrom, a chamber on the arm, and frame vibration dampening means associated with said chamber.

15. In a motor vehicle frame subject to vibration about an axis, an arm secured rigidly to the frame and extending outwardly therefrom, a chamber on the arm, and frame vibration dampening means enclosed within said chamber.

16. In a motor vehicle frame subject to vibration about an axis, an arm secured rigidly to the frame and extending outwardly therefrom, a chamber on the outer end of the arm, and means cooperating with the walls of the chamber to dampen said frame vibration.

17. In a bumper construction for motor vehicles, a rubber mounting associated with the bumper, and a weight suspended by the rubber mounting.

18. In a bumper construction for motor vehicles, a rubber mounting associated with the bumper, and a weight entirely suspended by the rubber mounting.

19. In a bumper structure for motor vehicles, a rubber mounting associated with the bumper, and a weight suspended by the rubber mounting for movement relative to the bumper, said rubber resisting movement of the weight by a shearing action of the rubber.

20. In a motor vehicle having parts forming a primary vibratory system, a secondary vibratory system for damping the vibrations set up in the primary system comprising a rubber mounting associated with one of the parts of the primary system, and a weight entirely suspended by the rubber.

21. In a motor vehicle having parts forming a primary vibratory system, a secondary vibratory system for damping the vibrations set up in the primary system comprising a rubber mounting on a part of the primary system, and a weight suspended by the rubber mounting for movement relative to the parts of the primary vibratory system, said rubber mounting resisting the relative movement of the weight by a shearing action of the rubber.

22. In a motor vehicle having a bumper forming a part of a primary vibratory system, a secondary vibratory system for damping the vibrations set up in the primary system comprising rubber mountings on each end of the bumper, and a weight resiliently supported in each rubber mounting for restricted movement relative to the bumper.

23. In a motor vehicle having a frame forming a part of a primary vibratory system, an arm secured to the frame and extending outwardly therefrom, a rubber mounting secured to the arm, and a vibration damping mass supported by the rubber mounting.

In testimony whereof I affix my signature.

CLYDE R. PATON.